United States Patent
Mackin et al.

(10) Patent No.: US 7,306,513 B2
(45) Date of Patent: Dec. 11, 2007

(54) LEVELING BY OVER-COMPENSATION

(75) Inventors: Ryan Patrick Mackin, Milan, IL (US); Ryan Scott Herlyn, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/291,011

(22) Filed: Nov. 30, 2005

(65) Prior Publication Data

US 2007/0123326 A1   May 31, 2007

(51) Int. Cl.
*A01F 12/32* (2006.01)
*B07B 1/00* (2006.01)

(52) U.S. Cl. ..................................... 460/101
(58) Field of Classification Search ............. 460/101, 460/109, 102, 8–10; 56/10.2 R, 14.5; 701/50; 209/394, 674
See application file for complete search history.

(56) References Cited

U.S. PATENT DOCUMENTS

| | | | |
|---|---|---|---|
| 4,466,231 A * | 8/1984 | Rowland-Hill et al. | ......... 460/2 |
| 4,527,241 A * | 7/1985 | Sheehan et al. | ............... 701/50 |
| 4,535,788 A | 8/1985 | Rowland-Hill et al. | ........ 130/27 |
| 4,557,276 A * | 12/1985 | Hyman et al. | .................. 460/9 |
| 4,897,071 A * | 1/1990 | Desnijder et al. | ............. 460/10 |
| 5,282,771 A | 2/1994 | Underwood | .................... 460/8 |
| 6,468,154 B1 | 10/2002 | Eggenhaus et al. | ......... 460/101 |
| 6,553,300 B2 * | 4/2003 | Ma et al. | ........................ 701/50 |
| 6,579,172 B2 * | 6/2003 | Lauer | .......................... 460/101 |
| 6,632,136 B2 * | 10/2003 | Anderson et al. | ........... 460/101 |
| 6,726,559 B2 * | 4/2004 | Bischoff | ......................... 460/1 |
| 6,761,630 B1 * | 7/2004 | Schwinn et al. | ............ 460/101 |
| 6,843,719 B1 | 1/2005 | Sacquitne | .................... 460/101 |
| 6,890,253 B2 * | 5/2005 | Mammen et al. | ............ 460/101 |
| 7,001,267 B2 * | 2/2006 | Behnke et al. | .................. 460/6 |

FOREIGN PATENT DOCUMENTS

JP   07298770 A   * 11/1995

* cited by examiner

*Primary Examiner*—Árpád Fábián Kovács

(57) ABSTRACT

A system and method for limiting crop loss when harvesting on sloped or rolling ground by adjusting the chaffer and/or sieve, or longitudinal sections thereof, so as to overcompensate for the ground slope so that the chaffer and/or sieve sections are actually inclined away from horizontal opposite the direction of ground slope at a selected angle. Such overcompensation increases crop harvesting efficiencies over systems that simply work to level the chaffer and/or sieve sections, without the high expenses associated with a combine having a pivoting axle.

6 Claims, 4 Drawing Sheets

LEVELING BY OVER-COMPENSATION

FIELD OF THE INVENTION

The present invention relates agricultural combine harvesting machinery, and more particularly, to an apparatus and method for adjusting the combine cleaning shoe to offset the position of the shoe resulting from operating the combine on a slope.

BACKGROUND OF THE INVENTION

Combines are large self-propelled vehicles used for harvesting and threshing agricultural crop in a field. A combine operates by cutting or gathering crop standing in a field, and feeding the cut crop to a separator by means of a conveyor mechanism. In the separator, grain is threshed, or beaten from the husk, stems, pods, or cobs, and then the threshed grain is separated from crop material other than grain. After separating, some crop material other than grain is still mixed with the grain. A cleaning system is used to remove the crop material other than grain, sometimes called trash or chaff, from the grain. This is typically done in a device known as a cleaning shoe, which has mechanisms known as a chaffer and a sieve. Typically, the chaffer and sieve are large pans having a flat surface that are oscillated or vibrated to break up the crop material and separate out the grain. The chaffer and sieve can also be a series of adjacent planks that are oscillated or vibrated. The chaffer and sieve can be generally horizontally level from the front to back, or as is commonly seen, arranged to have an upward incline from front to back. In some cleaning systems, a fan is also used to blow the lighter chaff away from the heavier grain material in the chaffer and/or sieve.

In operation, the mixed grain and crop material is deposited onto the top front of the chaffer. The lighter weight chaff is separated from the grain by vibration and/or blowing, and the grain and small heavy particles of crop material other than grain fall through louvers in the floor of the chaffer onto the sieve, which is located beneath the chaffer. The sieve oscillates to separate out and break up crop material. The grain, which is heavier than the other crop material, falls through appropriate-size openings in the floor of the sieve, and the cleaned grain from the sieve is carried to the grain tank.

Because the cleaning shoe operates by shaking and/or blowing lighter material away from the heavier grain, cleaning shoes tend to work best on flat ground. When the combine is operated on a slope, the crop will tend to build up on the low side of the sieve and chaffer due to gravitational forces. This will result in inefficient cleaning action, with resultant grain loss.

While combines with pivoting wheel axles exist for use on land that is predominantly sloped, these hillside combine systems are complex and costly, and of a level of sophistication not needed for operation on generally flat ground or ground having only a mild degree of slope. Instead, one alternative solution for use with limited slope operation is for the level-land combines, as they are sometimes called, to utilize chaffers and sieves made from a plurality of adjacent longitudinal sections separated by dividers. When operating on a slope, material builds up against the dividers, which helps limit the crop build-up to just crop in that particular longitudinal section. However, these devices only reduce crop build-up on the downhill side of the combine, rather than completely eliminating the problem, resulting in cleaning that does not provide maximum grain yield, due to inefficient use of the cleaning shoe.

Additionally, some combines utilize systems in which the chaffer and/or sieve, or each longitudinal section thereof is pivotally mounted in a frame such that it can be pivoted or tilted relative to the frame to maintain the device level in relation to the slope of the combine and the ground. Such mechanisms are typically operated by means of an inclinometer and a motor to pivot the sections along their length with respect to the slope of the ground. Other mechanism utilize hanging weights tied into the pivots of the longitudinal sections to tilt the chaffer and/or sieve sections to horizontal and compensate for the slope of the combine. However, even with the use of systems that keep the chaffer or sieve sections horizontal relative to the ground slope, crop processing efficiency is decreased as compared to level-land processing, with efficiency losses depending on factors such as crop conditions and harvesting speed. Therefore, what is needed is a method and apparatus for crop harvesting on rolling or sloped ground that minimizes grain loss typically seen when harvesting on sloped ground, without having to reduce harvesting speed or utilize expensive mechanisms to achieve desired harvest yields.

SUMMARY OF THE INVENTION

The present invention, accordingly, provides a method limiting crop loss when harvesting on sloped or rolling ground having a limited slope by adjusting the chaffer and/or sieve, or longitudinal sections thereof, so as to overcompensate for the ground slope so that the chaffer and/or sieve sections are actually inclined away from horizontal opposite the direction of ground slope at a selected angle. Such overcompensation has been shown to produce increased crop harvesting efficiencies over systems that simply work to level the chaffer or sieve sections, without the high expenses associated with a hillside combine.

The present invention incorporates a system and apparatus for controlling a cleaning shoe having a chaffer and a sieve on a combine when the combine is operating on sloped ground comprising a detecting mechanism for detecting the angle of at least one of the chaffer or the sieve away from horizontal when the combine is operating on sloped ground, a control system for receiving the angle of operation from the detecting mechanism and calculating an angle of operation to improve grain harvesting efficiency, the angle being greater than the angle necessary to return the chaffer or sieve to a horizontal position, and a motor capable of rotating the chaffer or sieve about its longitudinal axis connected to at least one of the combine or sieve, the motor capable of receiving information from the control system to move the chaffer or sieve to the angle calculated by the control system.

DESCRIPTION OF THE PREFERRED EMBODIMENT

Figure 1:
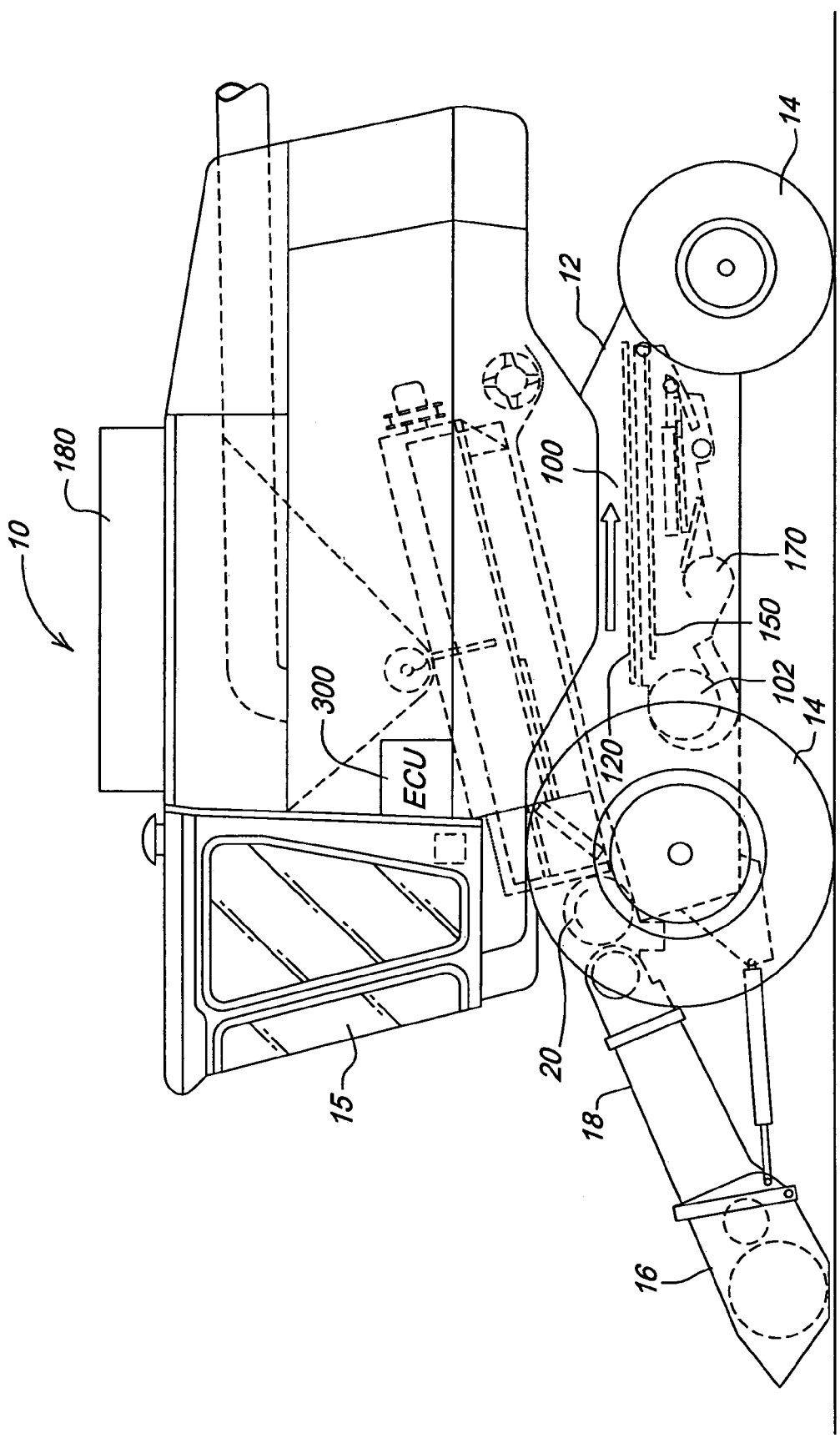
FIG. 1 is a schematic view illustrating a combine having a cleaning shoe in accordance with the present invention.

In the discussion of the FIGURES the same reference numerals will be used throughout to refer to the same or similar components. In the interest of conciseness, various other components known to the art, such as harvesters, storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning computer software operation and the like have been omitted inasmuch as such details are not considered necessary to obtain a complete understanding of the present invention, and are considered to be within the knowledge of persons of ordinary skill in the relevant art.

FIG. 1 shows a combine 10 used for harvesting agricultural crops. The combine 10 comprises a supporting structure 12 having ground engaging wheels 14 extending from the supporting structure 12. The operation of the combine 10 is controlled from the operator's cab 15. A harvesting platform 16 is used for harvesting grain-bearing crop and directing it to a feeder house 18. The cut crop is directed from the feeder house 18 to a separator mechanism 20 which threshes the grain from the crop material. Once the grain has been threshed and separated, some crop material other than grain is still mixed in with the grain and must be cleaned out, which is done in the cleaning shoe 100.

The cleaning shoe 100 is located downstream from the separator mechanism 20. The cleaning shoe 100 comprises a chaffer 120 and a sieve 150. In operation, the grain and chaff mixture is delivered to the front of the chaffer 120 from the separator mechanism 20. The chaffer 120 is shaken or vibrated so as to move the crop along over the surface of the chaffer 120 toward the rear of the combine 10 in the direction of the arrow. Heavier grain falls through openings in the chaffer 120 onto the sieve 150 below the chaffer 120. The final cleaning is done in the sieve 150. In some combines 10, a fan 102 blows air into or across the cleaning shoe 100 to blow the lighter chaff and straw away from the grain in the chaffer 120. The sieve 150 is also shaken or oscillated so as to move the crop along over the surface of the sieve 150 toward the rear of the combine 10 in the direction of the arrow shown. In some arrangement of combines 10, the sieve 150 oscillates with the chaffer 120, and in other combines 10, the sieve 150 oscillates in a direction counter to the chaffer 120. The grain falls through openings in the sieve 150 into the clean grain auger 170, and is carried from there to the grain tank 180.

Figure 2:
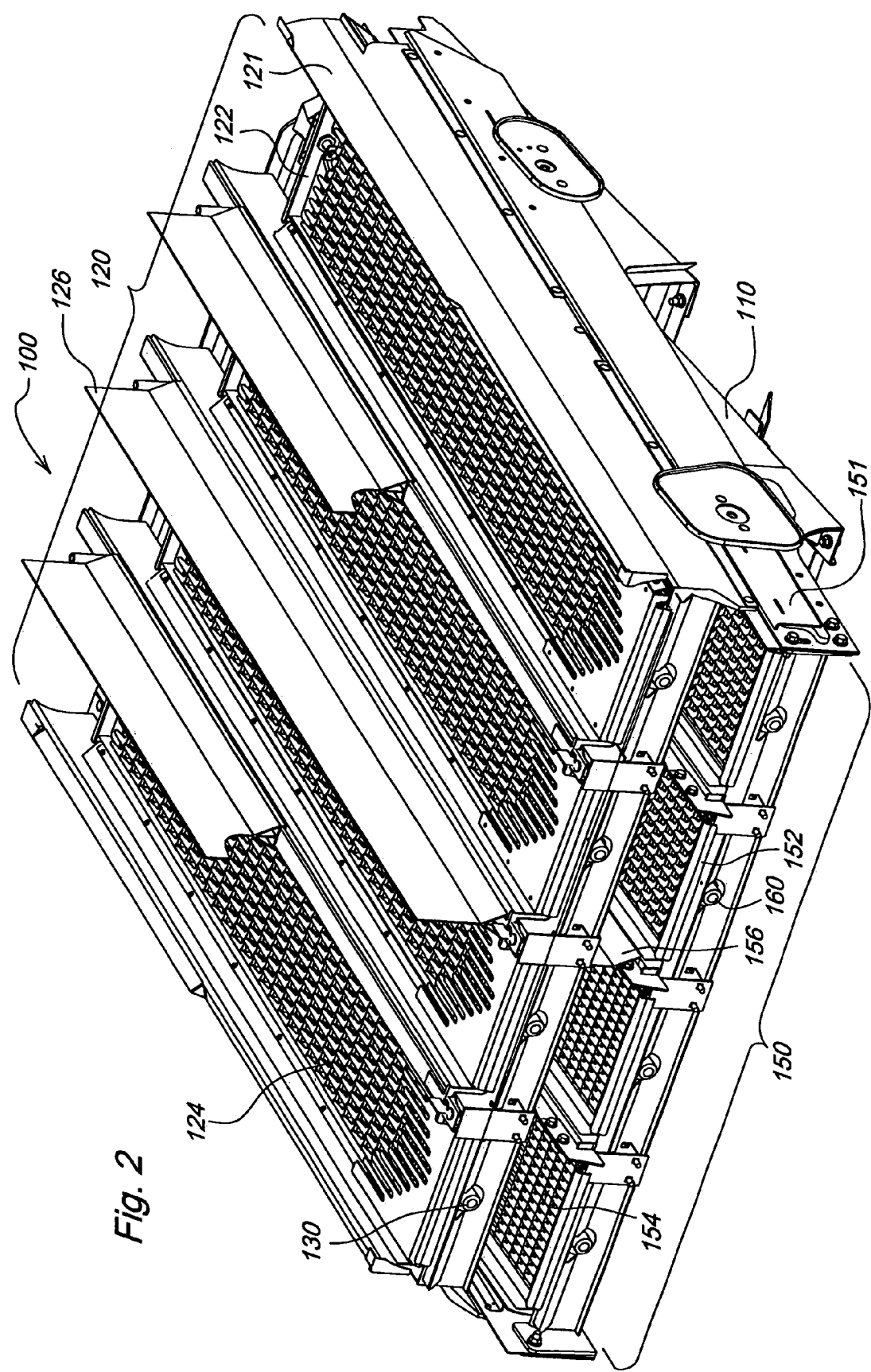
FIG. 2 is a perspective view of a cleaning shoe of the present invention.

As can be seen in FIG. 2, the cleaning shoe 100 has a frame 110 to which the chaffer 120, with the sieve 150 below the chaffer 120, are mounted or suspended. In many combines 10, the chaffer 120 is a single unit mounted in a frame having edges 121 along the outside length. In other combines 10, especially those which are used on sloping ground, the chaffer 120 is divided into a series of two or more longitudinal sections 122 mounted in the frame 121, extending the length of the chaffer 120 as shown in FIG. 2. Similarly, the sieve 150 can also be a single unit mounted in a frame having edges 151 along the outside length, or can have a series of two or more longitudinal sections 152 mounted in and extending the length of the sieve 150. The chaffer 120 and sieve 150 have a plurality of openings 124, 154 contained therein. The position, shape, size and number of openings can be varied to reflect the type of crop being harvested, and the size of the openings 124 in the chaffer 120 is can be different from the size of the openings 154 in the sieve 150.

The present invention is designed to work with both single-surface chaffers and sieves (not shown) and those having a plurality of longitudinal sections 122, 152 as shown in FIG. 2. Additionally, it has been found that having at least one of the chaffer 120 or sieve 150 containing multiple longitudinal sections 122, 152 results in increased efficiency when operating the combine 10 on a slope, and thus is a preferred embodiment. When the chaffer 120 and/or sieve 150 have a plurality of longitudinal sections 122, 152, there are dividers 126, 156 between the longitudinal sections. The dividers 126, 156 typically form a seal between and along the edge of the adjacent longitudinal section 122, 152 to prevent grain and/or crop material from falling through the gaps between the dividers 126, 156 and the longitudinal sections 122, 152 that are created when the combine 10 utilizing a cleaning shoe 100 of the present invention is operated on a slope and the longitudinal sections 122, 152 are tilted at an angle. In operation, the dividers 126, 156 work like the outside edges 121, 151 and provide a surface against which grain can accumulate when the combine 10 is leaning in that direction when operating on a slope. With dividers 126, 156 the grain is compartmentalized, thus limiting the amount of grain that accumulates against the edge 121, 151 or any one divider 126, 156, thus improving efficiency of the cleaning shoe 100.

When used with the present invention, the frame of the chaffer 120 and/or sieve 150 is configured with a pivot linkage mechanism to pivot or tilt about the longitudinal axis relative to the combine 10. For chaffers 120 or sieves 150 having a plurality of longitudinal sections 122, 152, each of the longitudinal sections 122, 152 is configured to pivot or tilt about the longitudinal axis relative to the combine 10. This is achieved by means of pivot pins 130, 160 at each end of the chaffer 120 or sieve 150 that provide a pivoting longitudinal axis. However, in some arrangements of the present invention, a single long tube, wire or shaft (not shown) runs down the length of the chaffer 120 or sieve 150, rather than interconnected pins used on each end. When a chaffer 120 or sieve 150 has multiple longitudinal sections, pins 130, 160 are used at the ends of each longitudinal section 122, 152 so that each longitudinal section 122, 152 can be pivoted.

The pins 130, 160 are connected to a motor-driven adjusting mechanism 200 that moves the longitudinal sections 122, 152 along the longitudinal axis, the mechanism 200 being capable of sufficient control to move the longitudinal sections to various angle for operation. Typically, an electric motor is used with the adjusting mechanism, although it can be appreciated that other types of drive devices, such as a weight-driven or hydraulic control system can be used as well. Additionally, in some arrangements of the present invention, a manual adjusting system can be used in addition to the motor-driven adjusting mechanism to enable the operator to make additional adjustments to the mechanism.

Figure 3:
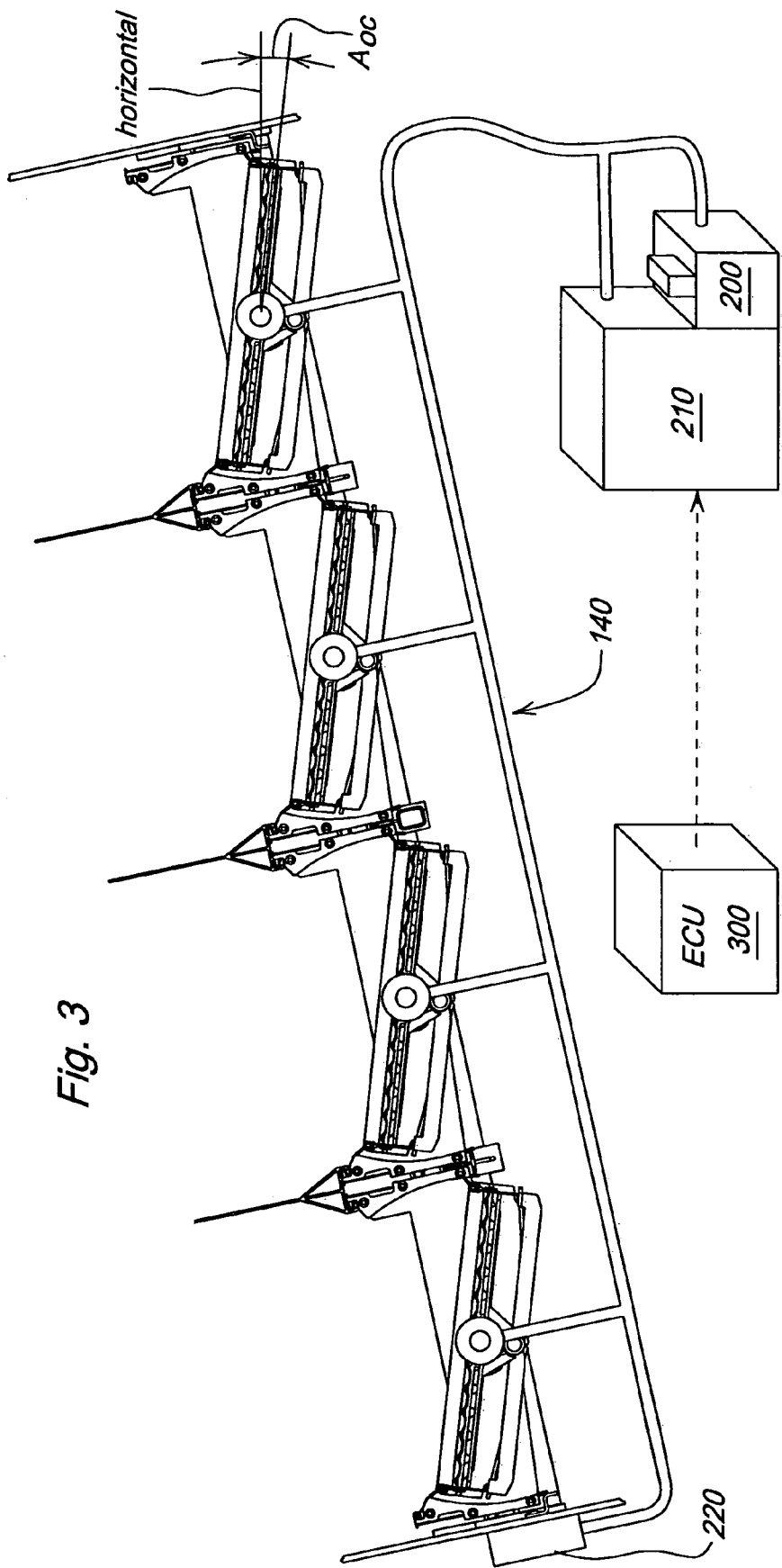
FIG. 3 is schematic sectional view illustrating a sieve of the present invention when the combine is on a slope.

As shown in FIG. 3, a control system 210 is attached to the motor driven adjusting mechanism 200, which controls movements of pivot linkage system. The control system 210 can also receive information from the vehicle Electronic Control Unit (ECU) 300 about combine speed, harvesting rates, and other factors that are relevant to operation of this system. In some arrangements of the present invention, only one of the chaffer 120 or sieve 150 is configured to provide for over-compensation, while in other arrangements of the present invention, both the chaffer 120 and sieve 150 are configured to provide for over-compensation. Additionally, in some arrangements of the present invention, an additional sub-control system 210' (not shown) is typically located in the cab 15 of the combine 10, which the operator can use to receive information from the detector mechanism 220, and input information to command the motor 200 for manual operation or override of the automated control system 210. A detector mechanism 220 is attached to at least one longitudinal section 122, 152, or the frame 110, and is used to detect when the combine 10 is operating on a slope. The detected angle of slope is fed back from the detector mechanism 220 to the control system 210 and/or 210'. Based on the information about the operating slope, the control system 210 can determine the ideal over-compensating operating angle $A_{oc}$, and the control system 210 can send commands to the motor 200 to tilt the longitudinal sections 122, 152, or entire chaffer 120 or sieve 150 to an angle equal to and opposite of the slope of the land plus an angle determined necessary to over-compensate for the slope of the ground, as shown in FIG. 3. For an arrangement of the invention having an operator override system, the cab control system 210' can also be used to select a desired operating angle and send commands to the motor 200 as to the preferred over-compensation angle for the longitudinal sections 122, 152 or entire chaffer 120 or sieve 150.

Figure 4:
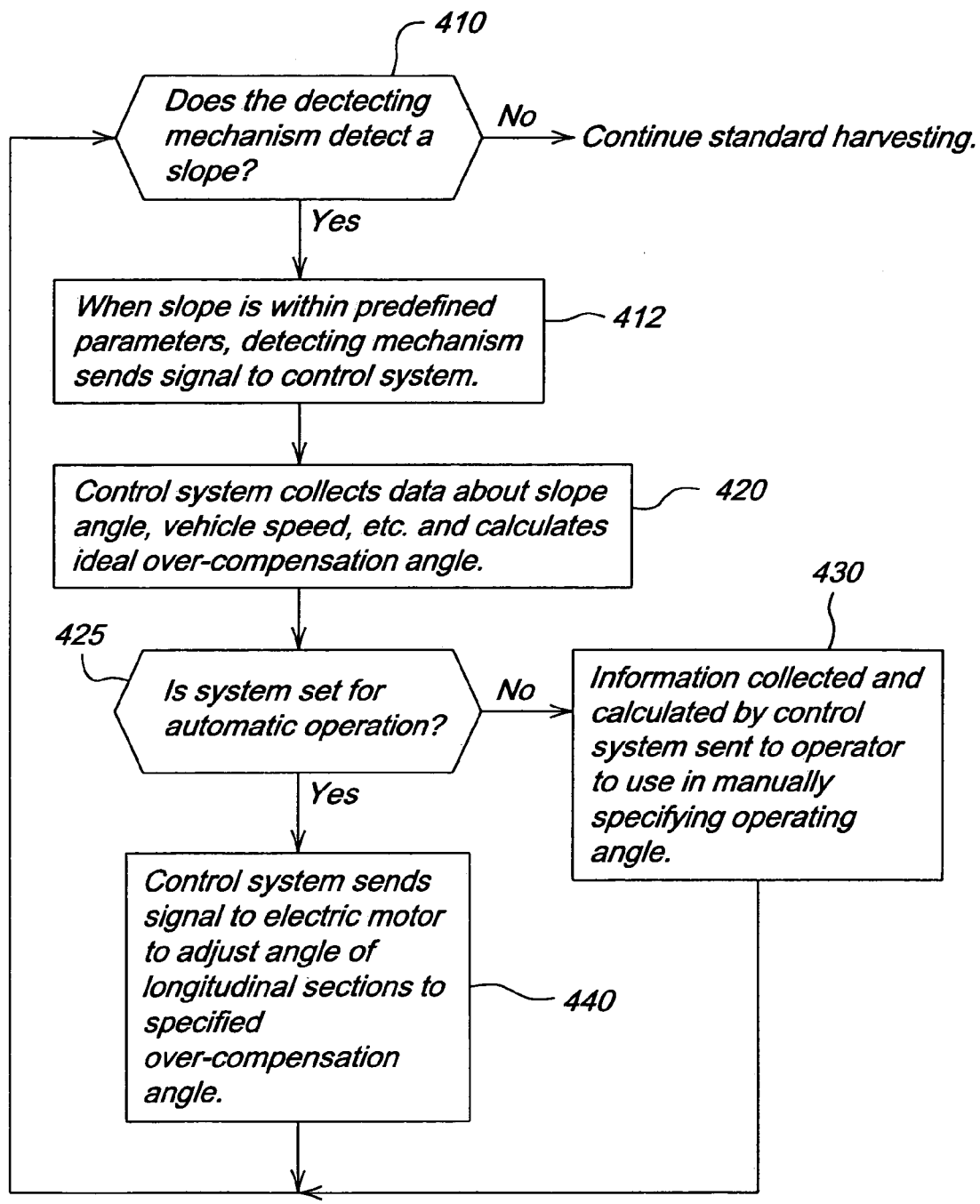
FIG. 4 is a flow chart showing the steps of the method of the present invention.

The function of the system in operation is represented in FIG. 4. The detector mechanism 220 monitors the combine 10 operation and sends signals to the control system 210 on a regular basis. In operation, when the combine 10 is operating at a laterally inclined angle, at step 410, a signal is sent from the detector mechanism 220 to the control system 210 about the angle of the operating slope. In arrangements of the present invention having an operator override or manual control system 210', the information from the detector mechanism 220 is sent to that control system 210' as well. When at step 412 the control system 210 receives more than a pre-defined number of signals that the combine 10 is operating on greater than a pre-defined level of slope, the over-compensation system of the present invention will be activated. If no, or insufficient slope information, or an insufficient change in slope from the prior slope is detected by the detector mechanism 220, the present invention will not be activated.

At step 420, the control system 210 will take the information received from the detector mechanism 220 about the operating angle of the combine 10, and can collect information from the combine ECU 300 about the current operating speed of the combine, and if suitable for the specific arrangement of the invention, other information such as current harvesting rate, type of crop being harvested, tipping ability of the cleaning shoe, and/or numerous other factors, and calculate the preferred over-compensation angle that would improve grain cleaning efficiency. One very simple formula that could be used to calculate the tilt angle $A_T$ needed to over compensate would be to take the current combine operating angle $A_c$, and multiply it by a specified value V to achieve the tilt angle $A_T$, the amount by which the longitudinal sections 122, 152 should be moved to achieve the appropriate over-compensation angle $A_{oc}$. For example, a standard value for V could be −2. If the combine operating angle $A_c$ is 6°, when it is multiplied by −2, the tilt angle $A_T$ would be −12°. The control system 210 would move the longitudinal sections 122, 152 for −12° from the current position in the opposite direction; this would bring the longitudinal sections 122, 152 to an over-compensation angle $A_{oc}$ of −6° from level. Other standard values for V could be used, such as −1.2, −1.5, etc. The standard value used could be varied depending on factors such as the crop type (i.e. corn, soy beans) being harvested. Other more complex formulas using other information and factors, such as those mentioned above, could also be used. It can be appreciated that different formulas can be used to calculate different over-compensation angles for the chaffer and sieve, or the same formula and angle used for both mechanisms.

At step 425, if the system is configured to operate in automatic mode, then at step 440, the control system 210 sends a signal to the motor 200 to activate the pivot linkage mechanism 140 and move the longitudinal sections 122, 152 or complete chaffer 120 and/or sieve 150 to the correct over-compensation angle to improve grain cleaning efficiency. At step 425, if it is determined that the system is set up to operate in manual/override operation, then at step 430, the operator can use the override control sub-system 210' to send commands to the motor 200 as to the desired over-compensation operating angle, if different from the calculated over-compensation angle. The operator can have access to the information collected by the control system in 420, including the calculated angle, for use in specifying an operating angle.

The detection mechanism 220 will continue to provide information about the current operating slope to the control system 210. The control system 210 will compare the inputs received to the previous inputs and determine if there has been a change in the operating slope, and if so, if the change is sufficient to recalculate the preferred overcompensation. In some arrangements of the present invention, the system can be configured to determine if the change in angle has continued for a specified number of inputs before recalculating the over-compensation angle. If so, then at step 420 the control system will calculate a new preferred angle and send the information to the automated control system 210 or the operator's control system 210' if the system is in manual/override operation if the new preferred angle does not equal the current position angle.

In some arrangements of the present invention, each longitudinal section can be positioned at the same over-compensating angle, or each longitudinal section can be adjusted to a different angle so as to appropriately over-compensate and maximize efficiency. For example, the longitudinal section on the furthest downhill side may be tilted at a greater angle than the adjacent or any other uphill longitudinal sections. If the system 210 has determined that for best yield the longitudinal sections 122, 152 should be at more than one angle, that information can be sent to the motor 200. If the system is not operating in automatic mode, the operator can use this information to manually adjust the longitudinal sections 122, 152 to the desired angle using the sub-control system 210" in the cab 15.

Having described the preferred embodiment, it will become apparent that various modifications can be made without departing from the scope of the invention as defined in the accompanying claims.

The invention claimed is:

1. A combine having a cleaning shoe for separating grain from chaff in a cut crop material, the cleaning shoe comprising:

a frame for attaching the cleaning shoe to the combine;

a chaffer for receiving a cut crop containing grain from a separator, the chaffer being movably secured in the cleaning shoe frame, the chaffer having edges along the length of the chaffer on the outside and a bottom surface having openings therethrough of a size that partially cleaned grain can fall through the chaffer onto the sieve below, the chaffer capable of oscillation so as to move the cut crop laterally along the top of the bottom surface of the chaffer;

a sieve located at least in part below the chaffer for receiving partially cleaned grain from the chaffer; the sieve being movably secured in the cleaning shoe frame, the sieve having edges along the length of the sieve on the outside and a bottom surface having openings therethrough of a size that cleaned grain can fall through the sieve, the sieve capable of oscillation so as to move the grain laterally along the top of the bottom surface of the sieve;

at least one of the chaffer and the sieve having a pivoting mechanism attached thereto, the pivoting mechanism having a detecting mechanism for detecting the angle from horizontal at which the bottom surface of the chaffer or sieve is positioned;

a motor capable of pivoting the bottom surface of the chaffer or sieve laterally about a longitudinal axis thereof; and a control system capable of receiving input from at least the detecting mechanism and calculating an angle of operation for the bottom surface that increases grain yield, the angle being greater than an angle necessary to position the bottom surface horizontally level, the control system capable of sending a command to the motor to pivot the bottom surface of the chaffer or sieve to the angle of operation;

wherein the control system is capable of receiving input from at least one other device than the detecting mechanism and using the input received from the at least one other device in calculating a preferred angle of operation.

2. The combine of claim 1 wherein the bottom surface of at least one of the chaffer or sieve comprises a plurality of longitudinal sections mounted laterally, the apparatus configured so the longitudinal sections can pivot about their longitudinal axis independently of each other longitudinal sections, the apparatus further comprising a divider and gasket between adjacent longitudinal sections.

3. The combine of claim 1 wherein the control system continuously receives inputs from the detecting mechanism.

4. A system for controlling a cleaning shoe having a chaffer and a sieve on a combine when the combine is operating on sloped ground, the system comprising:

a detecting mechanism for detecting an angle of operation of at least one of the chaffer or the sieve away from horizontal when the combine is operating on sloped ground;

a control system for receiving the angle of operation from the detecting mechanism and calculating a desired angle of operation to improve grain harvesting efficiency, the desired angle of operation being greater than an angle necessary to return the chaffer or sieve to horizontal;

a motor capable of rotating the chaffer or sieve about its longitudinal axis connected to at least one of the combine or sieve, the motor capable of receiving information from the control system to move the chaffer or sieve to the desired angle of operation calculated by the control system; and wherein the control system is capable of receiving input from at least one other device than the detecting mechanism and using the input received from the at least one other device in calculating the desired angle of operation.

5. The system of claim 4 further comprising at least one of the chaffer or sieve having a plurality of longitudinal sections separated from adjacent sections with a divider, the longitudinal sections mounted laterally to form a floor of the chaffer or sieve, the system capable of rotating the longitudinal sections about their longitudinal axis independently of each other longitudinal sections.

6. The system of claim 4 wherein the control system continuously receives angle of operation information from the detecting mechanism, calculates the angle of operation to improve grain harvesting efficiency, and when the new angle is different than the current angle of operation, sends a signal to the motor to change the angle.

* * * * *